Patented July 10, 1951

2,559,835

UNITED STATES PATENT OFFICE 2,559,835

REACTION PRODUCTS OF NITRILES

Ernst Zerner and Mark W. Pollock, New York, N. Y., assignors to Sun Chemical Corporation, New York, N. Y., a corporation of Delaware No Drawing. Application March 20, 1948, Serial No. 16,135

11 Claims. (Cl. 260—248)

1

This invention relates to new organic materials and to processes for preparing such materials.

One object of the present invention is to provide hitherto unavailable hexahydro-1,3,5-triacyl-s-triazines.

Another object of the present invention is to provide a process for preparing such materials by effecting reaction between a nitrile and a material which produces formaldehyde in the presence of a catalytic amount of a mineral acid containing $SO_3$ in the molecular formula.

Other objects of the present invention will be apparent from the description and appended claims.

In accordance with the present invention we have provided a series of hitherto unavailable organic materials which may be classified as hexahydro-1,3,5-triacyl-s-triazines, which new materials may be represented by the general formula

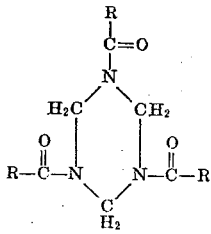

where R represents substituted or unsubstituted open chain hydrocarbon radicals. In preparing these hitherto unavailable materials, reaction is effected between a nitrile and formaldehyde or a substance which produces formaldehyde under the reaction conditions, in the presence of a catalytic amount of a mineral acid containing $SO_3$ in the molecular formula and such reaction is effected under substantially anhydrous conditions.

The reaction and the formation of the new products of the present invention may be described by the equation

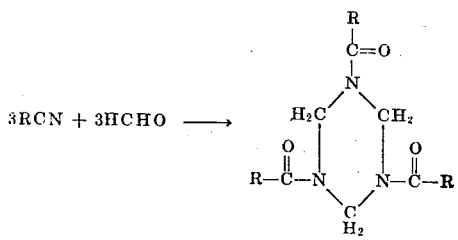

where R has the same meaning as above set forth.

Illustrative of successful practical operations

2 of the present invention useful in preparing the products thereof are the following examples, where all parts are given by weight.

Example I

In a suitable reaction vessel provided with stirrer, reflux-condenser, thermometer and a dropping funnel are placed 41 parts of acetonitrile and 4 parts of concentrated sulfuric acid. The admixture is heated on a boiling water bath and a solution of 60 parts trioxane and 41 parts of acetonitrile added dropwise. Total molar ratio of acetonitrile to formaldehyde is 1:1. When approximately one-third of the solution of trioxane in acetonitrile is added, a rapid increase in the temperature within the reaction vessel is observed, and the reaction is regulated by the rate of addition of the remaining trioxane solution. When the temperature decreases, the reaction vessel is heated with a free flame, until no further refluxing is observed. The entire procedure may satisfactorily be completed within approximately 2 hours.

The reaction mixture, which is a dark viscous liquid, is cooled to approximately 80° C. and then transferred to a suitable crystallization vessel. Fifty parts of water then are added thereto with agitation. Upon the addition of water crystallization occurs almost immediately. The crystallized material may be allowed to stand at a temperature slightly below room temperature to allow completion of the crystallization. Thereafter, the crystalline material is filtered.

To complete purification of the crystalline material, the latter may be recrystallized from hot water, and upon recrystallization and separation therefrom, may be washed with ethanol and ether; to give a product M. P. 71–73° C.

Upon drying of the crystals over phosphorus pentoxide at 100° C. under vacuum conditions, or by recrystallization from absolute ethanol, an anhydrous product is formed having a melting point of 96–98° C. The yield of product amounts to 66 per cent of the theoretical yield of hexahydro-1,3,5-triacetyl-s-triazine. The molecular weight of this material, calculated, is 213 and the molecular weight of the product was found to be 219.1.

Example II

The procedure described in Example I is utilized except that in place of concentrated sulfuric acid there is used the same weight of a mixture of equal parts of concentrated sulfuric acid and 30% oleum. The product obtained is identical with that of Example I and yields are approximately the same.

Example III

The procedure described in Example I is followed except that there is utilized a total of 82 parts of acetonitrile and 30 parts of trioxane, which represents a ratio of 2 mols of nitrile to 1 mol of formaldehyde. In this case the yield of product is approximately the same as that secured in Example I and the product is identical with that described in Example I.

Example IV

Paraformaldehyde, solid, added stepwise is used instead of trioxane under substantially similar conditions. The course of the reaction and the reaction product obtained are the same as in Example I.

Example V

The procedure set forth in Example I is followed except that there is utilized 55 parts of propionitrile, 30 parts of trioxane and 1.3 parts of concentrated sulfuric acid. By recrystallization from alcohol a product is obtained having a melting point of 169–171° C. This product is hexahydro-1,3,5-tripropionyl-s-triazine. The analysis for this material, calculated, is C, 56.47; H, 8.23; N, 16.1; molecular weight 2.55. In the case of the product of Example V there is found the following on analysis: C, 56.75; H, 8.13; N, 16.33; molecular weight 258.7.

Example VI

The procedure set forth in Example I is followed except that there is utilized 55 parts of propionitrile, 30 parts of trioxane and 2 parts of chlorosulfonic acid. A product is obtained which is hexahydro-1,3,5-tripropionyl-s-triazine, and which is identical with the product of Example V.

Example VII

The procedure followed is substantially the same as in Example I except that there is utilized 6 parts of trioxane, 20.6 parts of benzonitrile and 0.4 part of concentrated sulfuric acid. The reaction was heated only on the boiling water bath for 1.5 hours. In this case a product is obtained having a melting point at 218–222° C. This product is hexahydro-1,3,5-tribenzoyl-s-triazine. Analysis for the latter material, calculated, is: C, 72.18; H, 5.26; N, 10.53. On analysis the product of this example showed the following composition: C, 72.03; H, 5.37; N, 10.38.

Example VIII

The procedure set forth in Example I is followed substantially except that there is utilized 150 parts of trioxane, 265 parts of acrylonitrile redistilled and 2.8 parts of concentrated sulfuric acid. Also, in the case of this example the acrylonitrile, dissolved in 200 parts by weight of benezene is placed in the reaction vessel and the trioxane, in the dropping funnel, is dissolved in 400 parts by weight of benzene. The product of the reaction is hexahydro-1,3,5-triacrylyl-s-triazine. The latter has a calculated nitrogen content of 16.5 per cent, while the product of Example VIII has a nitrogen content of 16.71 per cent. The product sinters at 157° C. and does not melt as high as 285° C.

Example IX

A mixture of 37 parts methacrylonitrile and 1.8 parts concentrated sulfuric acid is heated to reflux and a solution of 30 parts trioxane dissolved in 30 parts methacrylonitrile added in small portions. After every addition of a few drops of the trioxane solution an exothermic effect is observed. When the addition is completed, the mixture is refluxed for another 30 minutes. Most of the unreacted starting material is eliminated by distillation and the residue treated with ethanol, filtered and the ethanol solution concentrated to about half of its volume and cooled. There are obtained white crystals of hexahydro-1,3,5-trimethacrylyl-s-triazine, melting point 149–151° C. Analysis showed N, 14.36%, calculated 14.43%.

Example X

A mixture of 45 parts beta-chloropropionitrile and 1.85 parts concentrated sulfuric acid is heated on the boiling water-bath and a solution of 30 parts trioxane in 45 parts beta-chloropropionitrile added at such a rate, that the temperature of the reaction mixture does not exceed 108° C. Near the end of the addition the mixture crystallizes spontaneously. Recrystallization from ethanol yields white crystals of hexahydro-1,3,5-tri(beta-chloropropionyl)-s-triazine, in 75% of theory. Analysis showed N, 11.8%, calculated 11.72%.

From the above illustrative examples it is seen that the process of the present invention may be applied to effect reaction between organic nitriles containing substituted or unsubstituted open chain hydrocarbon or aryl radicals and formaldehyde, or a substance which produces formaldehyde, in the presence of a catalytic amount of a mineral acid containing $SO_3$ in the molecular formula under substantially anhydrous conditions.

The ratio of nitrile and formaldehyde or formaldehyde producing substance utilized in the process of the present invention does not appear to be critical. Satisfactory results have been secured with molecular equivalents of these reactants.

Also, the amount of acid catalyst employed may be varied somewhat without affecting substantially the reaction of the present invention or the products thereof, so long as the amount utilized is within the range ordinarily understood as a catalytic quantity. In the case of reactions of the present invention, satisfactory results have been obtained where the quantity of acid catalyst is within the range of 0.5 part to 10 parts by weight for each molecular equivalent of nitrile employed. Too large a quantity of acid will lead to undesirable products other than the triazines of the present invention, while too small a quantity of acid will impede the speed of the reaction. Mineral acids containing $SO_3$ in the molecular formula such as sulfuric acid, chlorosulfonic acid and fluorosulfonic acid appear to be specific catalysts essential to the process of the present invention.

Also, the process of the present invention should be effected under substantially anhydrous conditions to secure the products thereof.

In the specific illustrative examples of the practicing of the present invention, individual nitrile materials have been employed as starting materials for securing of the products of the present invention. In place of the individual nitriles, mixtures of nitrile materials can be employed.

While the above products and processes of making the same constitute preferred embodiments of the invention, changes may be made therein without departing from the scope of the invention as defined in the appended claims.

What is claimed is:

1. As new compositions of matter, hexahydro-1,3,5-triacyl-s-triazines of the general formula

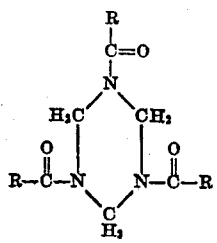

where R is a member of the group consisting of alkyl and halogen substituted and unsubstituted open chain hydrocarbon radicals and mixtures thereof.

2. Hexahydro-1,3,5-triacetyl-s-triazine corresponding to the formula

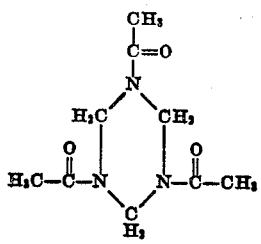

3. Hexahydro-1,3,5-triacrylyl-s-triazine corresponding to the formula

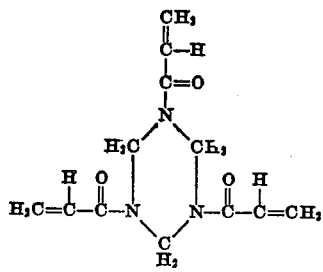

4. Hexahydro - 1,3,5 - tri - (beta - chloropropionyl)-s-triazine corresponding to the formula

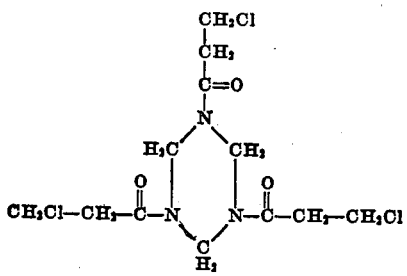

5. A process for the preparation of hexahydro-1,3,5-trimethacrylyl-s-triazine which comprises effecting reaction, under substantially anhydrous conditions, of methacrylonitrile with a substance which produces formaldehyde, in the presence of a catalytic amount of a mineral acid of the group consisting of sulfuric acid and chlorosulfonic acid.

6. A process for the preparation of hexahydro-1,3,5-tripropionyl-s-triazine which comprises effecting reaction, under substantially anhydrous conditions, of propionitrile with a substance which produces formaldehyde, in the presence of a catalytic amount of a mineral acid of the group consisting of sulfuric acid and chlorosulfonic acid.

7. A process for preparing compounds of the general formula

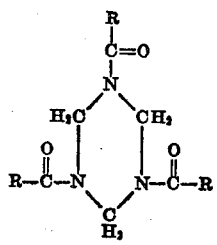

where R is a member of the group consisting of unsubstituted, and alkyl and halogen substituted, open chain hydrocarbon radicals, and mixtures thereof, which comprises effecting reaction, under substantially anhydrous conditions, of a nitrile of the general formula RCN where R is a member of the group consisting of unsubstituted, and alkyl and halogen substituted open chain hydrocarbon radicals, with a substance which produces formaldehyde, in the presence of a catalytic amount of a mineral acid of the group consisting of sulfuric acid and chlorosulfonic acid.

8. Hexahydro - 1,3,5 - trimethacrylyl - s - triazine corresponding to the formula

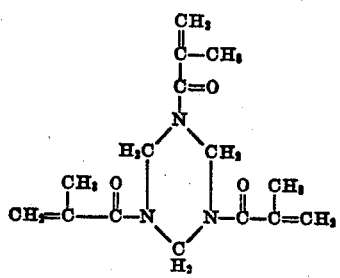

9. A process for the preparation of hexahydro-1,3,5-triacrylyl-s-triazine which comprises effecting reaction, under substantially anhydrous conditions, of acetonitrile with a substance which produces formaldehyde, in the presence of a catalytic amount of a mineral acid of the group consisting of sulfuric acid and chlorosulfonic acid.

10. A process for the preparation of hexahydro-1,3,5-triacryly-s-triazine which comprises effecting reaction, under substantially anhydrous conditions, of acrylonitrile with a substance which produces formaldehyde, in the presence of a catalytic amount of a mineral acid of the group consisting of sulfuric acid and chlorosulfonic acid.

11. A process for the preparation of hexahydro-1,3,5-tri(beta-chloropropionyl)-s-triazine which comprises effecting reaction, under substantially anhydrous conditions, of beta-chloropropionitrile with a substance which produces formaldehyde, in the presence of a catalytic amount of a mineral acid, of the group consisting of sulfuric acid and chlorosulfonic acid.

ERNST ZERNER.
MARK W. POLLOCK.

REFERENCES CITED

The following references are of record in the file of this patent:

UNITED STATES PATENTS

| Number | Name | Date |
| --- | --- | --- |
| 1,989,042 | Kunz | Jan. 22, 1935 |
| 2,115,550 | Ellis | Apr. 26, 1938 |
| 2,292,333 | D'Alelio | Aug. 4, 1942 |
| 2,304,624 | Burke | Dec. 8, 1942 |
| 2,386,586 | Brant | Oct. 9, 1945 |

Certificate of Correction

Patent No. 2,559,835                                          July 10, 1951

ERNST ZERNER ET AL.

It is hereby certified that error appears in the printed specification of the above numbered patent requiring correction as follows:

Column 3, line 29, for "2.55" read *255*; column 6, line 39, for "triacrylyl" read *triacetyl*; line 46, for "triacryly" read *triacrylyl*;

and that the said Letters Patent should be read as corrected above, so that the same may conform to the record of the case in the Patent Office.

Signed and sealed this 9th day of October, A. D. 1951.

[SEAL]

THOMAS F. MURPHY,
*Assistant Commissioner of Patents.*